US012764625B2

(12) United States Patent
Christoffersson et al.

(10) Patent No.: US 12,764,625 B2
(45) Date of Patent: Oct. 13, 2026

(54) NETWORK NODE TRIGGERED MOBILITY MEASUREMENT REPORTING

(71) Applicant: Telefonaktiebolaget LM Ericsson (publ), Stockholm (SE)

(72) Inventors: Jan Christoffersson, Luleå (SE); Min Wang, Luleå (SE); Mårten Ericson, Gammelstad (SE); Tommy Arngren, Södra Sunderbyn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 746 days.

(21) Appl. No.: 17/910,994

(22) PCT Filed: Mar. 14, 2020

(86) PCT No.: PCT/SE2020/050269

§ 371 (c)(1),
(2) Date: Sep. 12, 2022

(87) PCT Pub. No.: WO2021/188020

PCT Pub. Date: Sep. 23, 2021

(65) Prior Publication Data

US 2023/0147090 A1 May 11, 2023

(51) Int. Cl.
*H04W 36/30* (2009.01)
*H04W 36/00* (2009.01)

(52) U.S. Cl.
CPC ....... *H04W 36/30* (2013.01); *H04W 36/0009* (2018.08); *H04W 36/0055* (2013.01); *H04W 36/0085* (2018.08)

(58) Field of Classification Search
CPC ............ H04W 36/30; H04W 36/0009; H04W 36/0058; H04W 36/0085
See application file for complete search history.

(56) References Cited

U.S. PATENT DOCUMENTS

| | | | | |
|---|---|---|---|---|
| 11,388,763 | B2 * | 7/2022 | Stauffer .............. | H04W 84/047 |
| 2011/0080962 | A1 * | 4/2011 | Blankenship ....... | H04L 27/0006 375/259 |

(Continued)

OTHER PUBLICATIONS

Author Unknown, "Technical Specification Group Radio Access Network; Study on Integrated Access and Backhaul; (Release 15)," Technical Report 38.874, Version 1.0.0, Dec. 2018, 3GPP Organizational Partners, 111 pages.

(Continued)

*Primary Examiner* — Raj Jain
(74) *Attorney, Agent, or Firm* — Sage Patent Group

(57) ABSTRACT

There is provided mechanisms for triggering mobility measurements. A method is performed by a network node. The method comprises obtaining information about backhaul link quality of a wireless backhaul link of the network node. The method comprises, as a result thereof, sending, to at least a subset of all UEs served by the network node in a cell, an indication for the subset of UEs to perform mobility measurements. The method comprises receiving mobility measurement reports from the subset of UEs. The method comprises determining a handover action for the subset of UEs based at least on the backhaul link quality and on the mobility measurement reports.

15 Claims, 9 Drawing Sheets

(56) References Cited

U.S. PATENT DOCUMENTS

| | | | | |
|---|---|---|---|---|
| 2011/0081903 | A1* | 4/2011 | Cai | H04W 36/0058 455/424 |
| 2012/0028627 | A1 | 2/2012 | Hunzinger | |
| 2013/0130684 | A1* | 5/2013 | Gomes | H04W 4/70 455/435.1 |
| 2014/0024375 | A1 | 1/2014 | Fitzpatrick et al. | |
| 2020/0021409 | A1* | 1/2020 | Kumar | H04W 72/0453 |
| 2023/0147090 | A1* | 5/2023 | Christoffersson | H04W 36/0055 370/331 |

OTHER PUBLICATIONS

Author Unknown, "Technical Specification Group Radio Access Network; NG-RAN; Architecture description (Release 15)," Technical Specification 38.401, Version 15.6.0, Jun. 2019, 3GPP Organizational Partners, 46 pages.

VIVO, "R2-1804996: Initial consideration on dynamic route selection," 3GPP TSG-RAN WG2 Meeting #101bis, Apr. 16-20, 2018, Sanya, China, 4 pages.

International Search Report and Written Opinion for International Patent Application No. PCT/SE2020/050269, mailed Nov. 16, 2020, 11 pages.

* cited by examiner

NETWORK NODE TRIGGERED MOBILITY MEASUREMENT REPORTING

TECHNICAL FIELD

Embodiments presented herein relate to a method, a network node, a computer program, and a computer program product for triggering mobility measurements. Embodiments presented herein further relate to a method, a User Equipment (UE), a computer program, and a computer program product for performing network node triggered mobility measurement reporting.

BACKGROUND

In communication networks, there may be a challenge to obtain good performance and capacity for a given communications protocol, its parameters and the physical environment in which the communications network is deployed.

For example, densification via the deployment of more and more base stations (be them macro or micro base stations) is one of the mechanisms that can be employed to increase bandwidth/capacity in a communication network. Due to the current availability of more spectrum in the millimeter wave (mmw) frequency band, deploying small cells that operate in this frequency band is one deployment option for this purpose. However, deploying optical fiber links, or other types of cables, to the small cells, which is the usual way in which small cells are deployed, can end up being both expensive and impractical. Employing wireless links for connecting the small cells to the core network might be both cheaper and more practical. One such option is Integrated Access and Backhaul (IAB) networks, where part of the radio resources can be utilized for backhaul purposes (i.e., for communication between two IAB nodes).

However, there could be situations where issues arise when handover of a UE is needed from one network node to another network node.

It would be desirable to provide new ways to address one or more of the abovementioned issues.

SUMMARY

An object of embodiments herein is to address one or more of the issues noted above.

According to a first aspect there is presented a method for triggering mobility measurements. The method is performed by a network node. The method comprises obtaining information about backhaul link quality of a wireless backhaul link of the network node. The method comprises, as a result thereof, sending, to at least a subset of all UEs served by the network node in a cell, an indication for the subset of UEs to perform mobility measurements. The method comprises receiving mobility measurement reports from the subset of UEs. The method comprises determining a handover action for the subset of UEs based at least on the backhaul link quality and on the mobility measurement reports.

According to a second aspect there is presented a network node for triggering mobility measurements. The network node comprises processing circuitry. The processing circuitry is configured to cause the network node to obtain information about backhaul link quality of a wireless backhaul link of the network node. The processing circuitry is configured to cause the network node to, as a result thereof, send, to at least a subset of all UEs served by the network node in a cell, an indication for the subset of UEs to perform mobility measurements. The processing circuitry is configured to cause the network node to receive mobility measurement reports from the subset of UEs. The processing circuitry is configured to cause the network node to determine a handover action for the subset of UEs based at least on the backhaul link quality and on the mobility measurement reports.

According to a third aspect there is presented a network node for triggering mobility measurements. The network node comprises an obtain module configured to obtain information about backhaul link quality of a wireless backhaul link of the network node. The network node comprises a send module configured to, as a result thereof, send, to at least a subset of all user equipment, UEs, served by the network node in a cell, an indication for the subset of UEs to perform mobility measurements. The network node comprises a receive module configured to receive mobility measurement reports from the subset of UEs. The network node comprises a determine module configured to determine a handover action for the subset of UEs based at least on the backhaul link quality and on the mobility measurement reports.

According to a fourth aspect there is presented a computer program for triggering mobility measurements. The computer program comprises computer program code which, when run on processing circuitry of a network node, causes the network node to perform a method according to the first aspect.

According to a fifth aspect there is presented a method for performing network node triggered mobility measurement reporting. The method is performed by a UE. The method comprises receiving, from a network node serving the UE in a cell, an indication to perform network node triggered mobility measurements. The method comprises, in response thereto, performing mobility measurements on reference signals received from at least one other network node. The method comprises sending a mobility report of the mobility measurements to the network node serving the UE.

According to a sixth aspect there is presented a UE for performing network node triggered mobility measurement reporting. The UE comprises processing circuitry. The processing circuitry is configured to cause the UE to receive, from a network node serving the UE in a cell, an indication to perform network node triggered mobility measurements. The processing circuitry is configured to cause the UE to, in response thereto, perform mobility measurements on reference signals received from at least one other network node. The processing circuitry is configured to cause the UE to send a mobility report of the mobility measurements to the network node serving the UE.

According to a seventh aspect there is presented a UE for performing network node triggered mobility measurement reporting. The UE comprises a receive module configured to receive, from a network node serving the UE in a cell, an indication to perform network node triggered mobility measurements. The UE comprises a measure module configured to, in response thereto, perform mobility measurements on reference signals received from at least one other network node. The UE comprises a send module configured to send a mobility report of the mobility measurements to the network node serving the UE.

According to an eight aspect there is presented a computer program for performing network node triggered mobility measurement reporting, the computer program comprising computer program code which, when run on processing circuitry of a UE, causes the UE to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network nodes, these UEs, and these computer programs enable a handover to be timely triggered before the UE experiences radio link failure.

Advantageously these methods, these network nodes, these UEs, and these computer programs enable efficient load balancing between network nodes It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
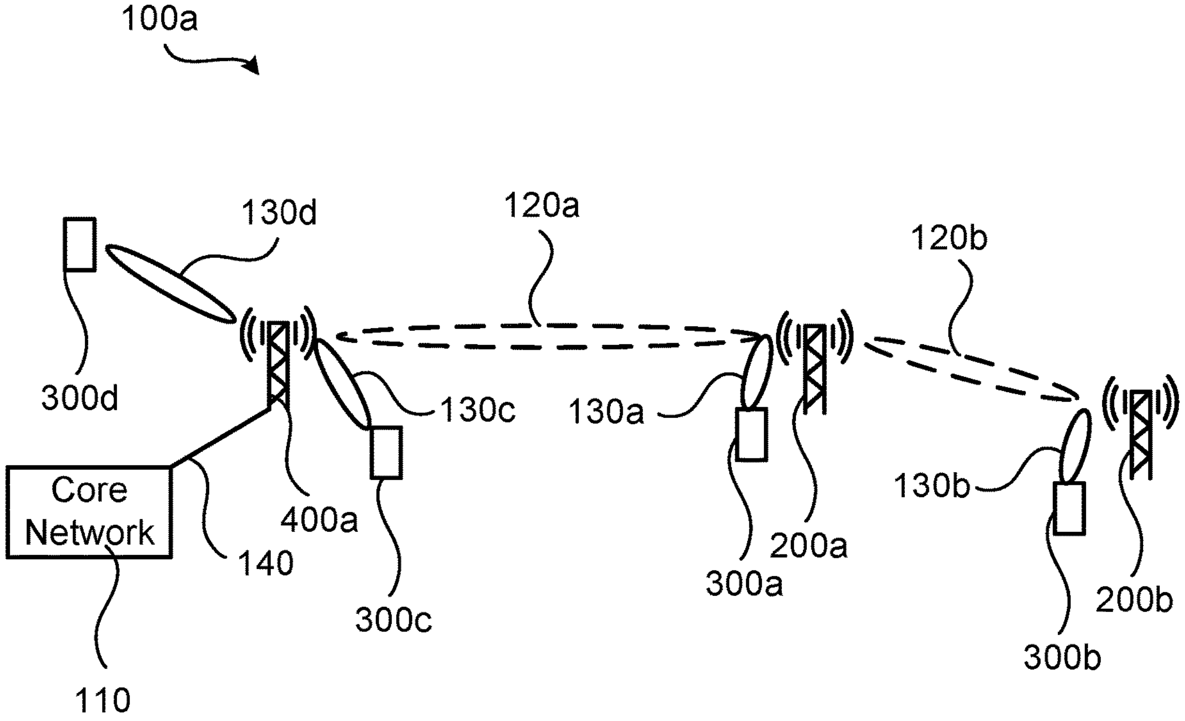
FIGS. 1 and 2 are schematic diagrams illustrating a communication network according to embodiments.

FIG. 1 is a schematic diagram illustrating a communication network 100*a* where embodiments presented herein can be applied. The communication network 100*a* comprises network nodes 200*a*, 200*b*, 400*a* that are operatively connected to a core network 110. Further, network node 200*b* is operatively connected to the core network 110 via network node 200*a* which in turn is operatively connected to the core network 110 via network node 400*a*. Further, whereas network node 400*a* has a wired connection to the core network 110, the communication between network node 400*a* and network node 200*a* as well as between network node 200*a* and network node 200*b* is over wireless backhaul links 120*a*, 120*b*.

In some aspects, the communication network 100*a* represents an IAB deployment where network node 400*a* acts as a donor node and network nodes 200*a* and 200*b* act as IAB relay nodes or IAB nodes. Further, since network node 200*a* is further upstream (i.e., operatively closer to the core network 110) than network node 200*b*, network node 200*a* might be regarded as a parent network node to network node 200*b* and network node 200*b* might be regarded as a child network node to network node 200*a*.

Further, each network node 200*a*, 200*b*, 400*a* provide network access to UEs 300*a*, 300*b*, 300*c*, 300*d* over wireless access links 130*a*, 130*b*, 130*c*, 130*d*. The UEs 300*a*:300*c* are thereby enabled to access services and exchange data with a service network (not shown) operatively connected to the core network 110. Each network node 200*a*, 200*b*, 400*a* could be any of: radio access network node, base station (BS), radio base station (RBS), base transceiver station (BTS), base station controller (BSC), radio network controller (RNC), g Node B (gNB), evolved Node B (eNB or eNodeB), Node B, multi-standard radio (MSR), radio node such as MSR BS, multi-cell/multicast coordination entity (MCE), integrated access and backhaul (JAB) node, relay node, donor node controlling relay, radio access point (AP), transmission points, transmission nodes, Remote Radio Unit (RRU) Remote Radio Head (RRH).

As disclosed above, there could be situations where issues arise when handover of a UE is needed from one network node to another network node.

In further detail, currently, all network nodes of the communication network 100*a* are assumed to be static, i.e., to be configured for operation at a fixed geographical location. It is envisioned that a network node might be moved from one location to another. One example of this would be if the network node is mounted on a network providing vehicle, such as a network connected Unmanned Aerial Vehicle (UAV) or the like. This would allow for both flexible and dynamic deployments of communication networks in the sense that the deployment could follow the user distribution, so that if a new hot spot of UEs would appear, the communication network could adjust its deployment in an optimal fashion.

When network nodes thus become moving network nodes, existing frameworks for handover would become insufficient due to lacking mobility support. In addition, the existing UE mobility mechanisms for handover and cell re-selection might not be directly applicable for a moving network node. Further on, existing mechanisms for handover are not designed for moving network nodes.

Figure 2:
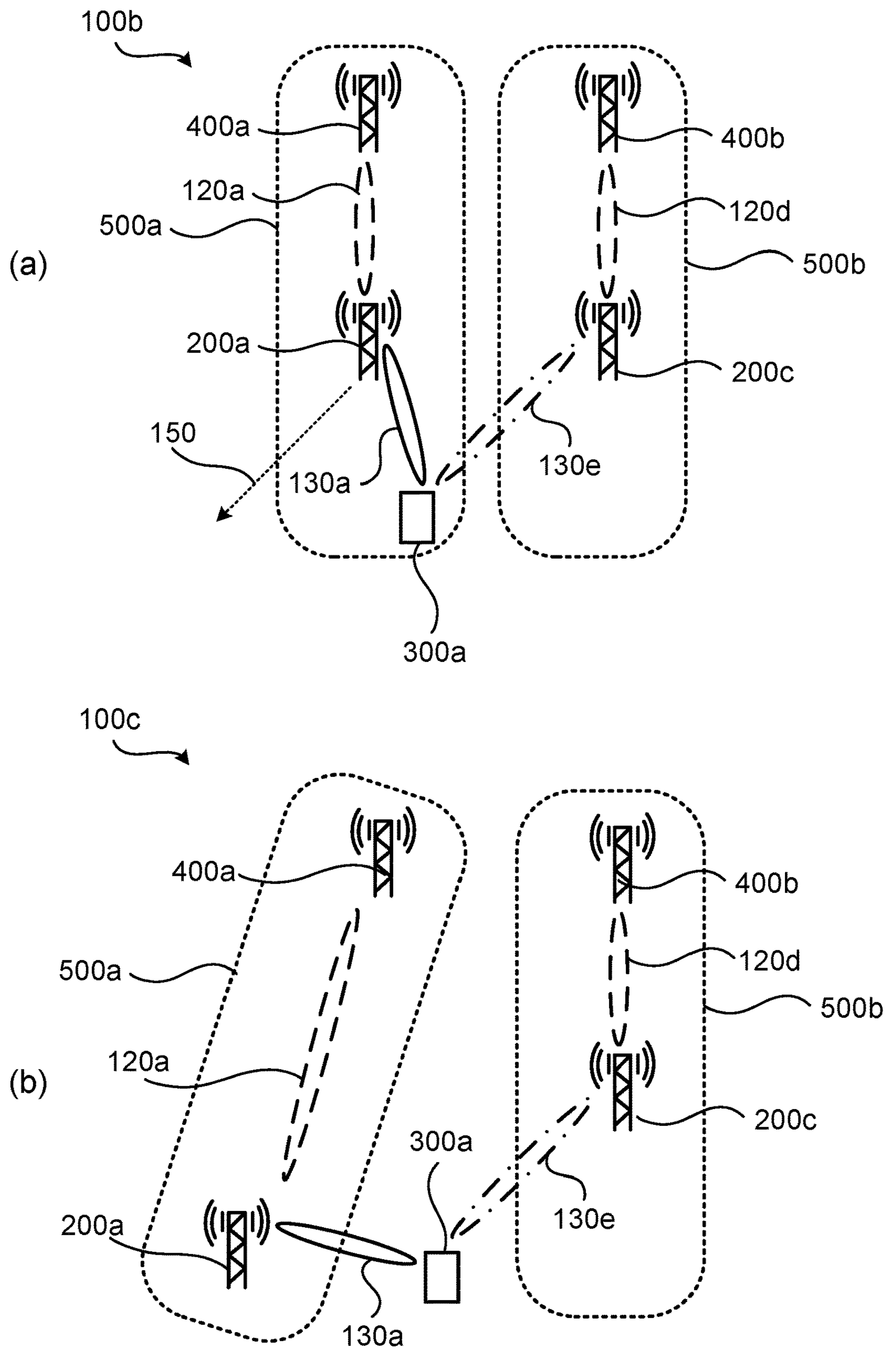

One issue is that it is not only the quality of the wireless access link 130*a* between the UE 300*a* and network node 200*a* that should be considered but also the wireless backhaul links 120*a*, 120*b*. This is illustrated in FIG. 2. FIG. 2(*a*)

is a schematic diagram illustrating a communication network 100*b* similar to communication network 100*a* but where there are two cells 500*a*, 500*b* with two network nodes in each cell; network nodes 200*a*, 400*a* are in cell 500*a* and network nodes 200*c*, 400*b* are in cell 500*b*. Assume that UE 300*a* is served by network node 200*a* over wireless access link 130*a* and that network node 200*a* is to be moved along the direction indicated by arrow 150*a*. Assume further that after movement, network node 200*a* will be located as in the communication network 100*c* of FIG. 2(*b*). Since the distance between network node 200*a* and UE 300*a* has changed only very little from FIG. 2(*a*) to FIG. 2(*b*) it can be assumed that the access link quality of wireless access link 130*a* has not changed. However, the move has caused the distance between network node 200*a* and network node 400*a* to increase, which might cause the backhaul link quality of wireless backhaul link 120*a* to deteriorate. In this respect, the UE 300*a* could use legacy mobility measurements for quality evaluation of its wireless access link(s), including wireless access link(s) of both the serving cell and any neighbouring cells. For example, the UE 300*a* could be supplied with a measurement configuration (e.g., time to trigger, hysteresis setting for handover triggering, etc.). But since the UE 300*a* is only capable of measuring the access link quality of the wireless access links 130*a* and 130*e*, the UE 300*a* would not notice deterioration of a backhaul link 120*a* from these configurations and measurements. Eventually, network node 200*a* might discover another network node (not shown) to which it establishes a new wireless backhaul link. But if not handled correctly, this might result in that UE 300*a* experiences a radio link failure (RLF) even though its access link quality has not been affected. The UE 300*a* might be eventually informed of the failure and perform RLF recovery to re-establish a wireless access link. But in cases where the network node 200*a* is moving, it would be too late for the UE 300*a* to be informed via RLF procedure, and data transmission would be interrupted. This could be the case in a network topology adaptation procedure for a migrating IAB node. More details of signalling in such a procedure are described in 3GPP TS 38.401 "NG-RAN; Architecture description", version 16.0.0, Section 8.2.1.1. If possible, such RLF should be avoided. If the situation is handled timely, the UE 300*a* can perform actions (for example, handover action) before an RLF failure is triggered.

The embodiments disclosed herein thus relate to mechanisms for triggering mobility measurements and network node triggered mobility measurement reporting. In order to obtain such mechanisms there is provided a network node 200*a*, a method performed by the network node 200*a*, a computer program product comprising code, for example in the form of a computer program, that when run on processing circuitry of the network node 200*a*, causes the network node 200*a* to perform the method. In order to obtain such mechanisms there is further provided a UE 300*a*, a method performed by the UE 300*a*, and a computer program product comprising code, for example in the form of a computer program, that when run on processing circuitry of the UE 300*a*, causes the UE 300*a* to perform the method.

Figure 3:
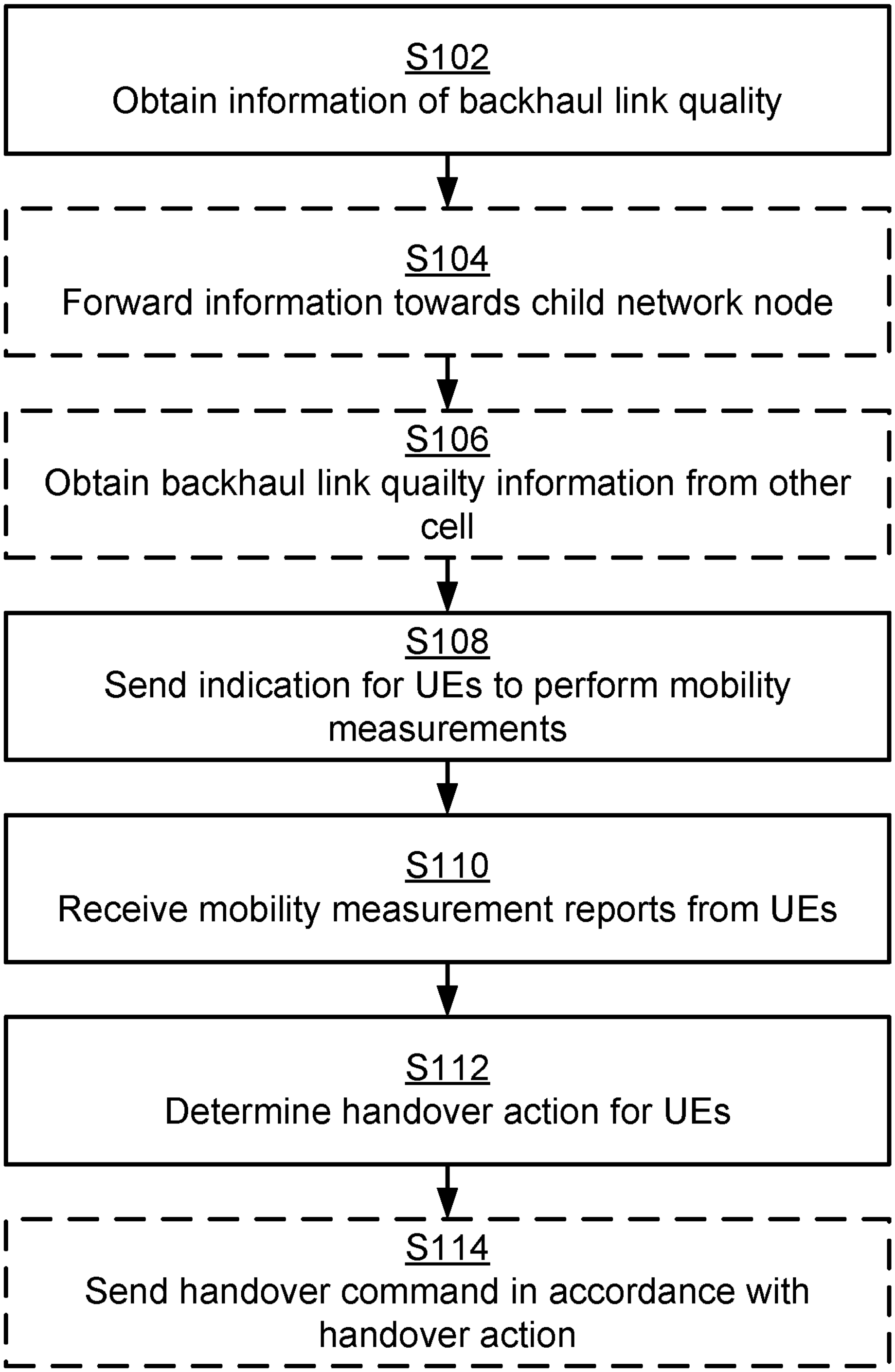
FIGS. 3, 4, 5, 6, 7, and 8 are flowcharts of methods according to embodiments.

Reference is now made to FIG. 3 illustrating a method for triggering mobility measurements as performed by the network node 200*a* according to an embodiment.

S102: The network node 200*a* obtains information about backhaul link quality of a wireless backhaul link of the network node 200*a*.

S108: The network node 200*a*, as a result of having obtained the information, sends, to at least a subset of all UEs 300*a* served by the network node 200*a* in a cell 500*a*, an indication for the subset of UEs 300*a* to perform mobility measurements.

S110: The network node 200*a* receives mobility measurement reports from the subset of UEs 300*a*.

S112: The network node 200*a* determines a handover action for the subset of UEs 300*a* based at least on the backhaul link quality and on the mobility measurement reports.

Embodiments relating to further details of triggering mobility measurements as performed by the network node 200*a* will now be disclosed.

There could be different examples of quality parameters according to which the backhaul link quality is measured. In some examples, the backhaul link quality pertains to at least one of: reference signal received power (RSRP), signal to interference plus noise ratio (SINR), reference signal received quality (RSRQ), received signal strength indicator (RSSI), etc.

There could be different wireless backhaul links of the network node 200*a* that information about backhaul link quality is obtained. Different embodiments relating thereto will now be described in turn.

In some aspects, the wireless backhaul link is between the network node 200*a* itself and its parent network node. That is, in some embodiments, the network node 200*a* is operatively connected to a parent network node, and the wireless backhaul link is between the network node 200*a* and the parent network node.

In some aspects, the wireless backhaul link is further upstream from the network node 200*a*. That is, in some embodiments, the network node 200*a* is operatively connected to a parent network node, and the wireless backhaul link is upstream the parent network node (and hence further closer to the wired connection to the core network).

There could be different types of information about the backhaul link quality that the network node 200*a* obtains in S102.

In some aspects, the information pertains to that the backhaul link quality of the wireless backhaul link is deteriorating. Particularly, in some embodiments, the wireless backhaul link is towards a donor node 400*a* of the network node 200*a*, and the information about the backhaul link quality pertains to that backhaul link quality of the wireless backhaul link towards the donor node 400*a* is deteriorating.

The information that the backhaul link quality is deteriorating might then pertain to at least one of: the backhaul link quality of the wireless backhaul link is below threshold link quality value, the bitrate of the wireless backhaul link is below a threshold bitrate value, the transmission delay of the wireless backhaul link is above a threshold transmission delay value.

Further, in this respect, there might be different ways to determine that the backhaul link quality of the wireless backhaul link towards the donor node 400*a* is deteriorating. In some embodiments, the backhaul link quality might be determined to be deteriorating by being worse than a threshold value, by being worse than the backhaul link quality of another wireless backhaul link towards the donor node 400*a*, or by being worse than the backhaul link quality of another wireless backhaul link towards another donor node 400*b*.

In further examples, the backhaul link quality of the wireless backhaul link is determined to be deteriorating when the backhaul link quality has decreased below a configured threshold quality value. The configured threshold quality value might be absolute or relative to a filtered average over a certain time period. In further examples, the backhaul link quality of the wireless backhaul link is determined to be deteriorating when the achieved bitrate on the wireless backhaul link has decreased below a configured threshold bitrate value. The configured threshold bitrate value might be absolute or relative to a filtered average over a certain time period. It might also be relative to the achieved bitrate of wireless backhaul links to any child network nodes or the access interface to the UE 300*a*, thereby ensuring that it is the backhaul link quality that is the bottleneck. In further examples, the backhaul link quality of the wireless backhaul link is determined to be deteriorating when the achieved transmission delay on the wireless backhaul link has increased above a configured threshold delay value. The configured threshold delay value might be absolute or relative to a filtered average over a certain time period.

There could be different ways for the network node 200*a* to determine to which UEs 300*a* the indication in S108 should be sent. In some aspect, the decision regarding which of all UEs 300*a* served by the network node 200*a* the indication is sent is based on prior information that the network node 200*a* has access to. For example, to which of all UEs 300*a* served by the network node 200*a* the indication is sent might depend on at least one of: degree of deterioration of the wireless backhaul link, previous measurement reports received from the UEs 300*a* (i.e., measurement reports received before S108 is performed, such as an ordinary mobility measurement report or a previously trigged mobility measurement report), Quality of Service (QoS) requirements for the UEs 300*a*, locations of the UEs 300*a*, and UE capability information.

Depending on the degree of deterioration of the wireless backhaul link, the indication in S108 could be sent to different subsets of UEs 300*a*. In one extreme case, for example when the performance of the wireless backhaul link is really low, e.g. 10% of its maximum performance, the indication in S108 could be sent to all UEs 300*a* which have data transported on this wireless backhaul link. In case the performance of the wireless backhaul is only slightly degraded, the indication in S108 could be sent only to a small subset of the UEs 300*a*.

There could be different ways for the network node 200*a* to send the indication in S108. In some examples, the indication is sent as a single bit, where the value "o" indicates that no mobility measurements are to be performed whereas the value "1" indicates that mobility measurements are to be performed. In some examples, the indication is sent as a flag, where when the flag is set, this indicates that mobility measurements are to be performed and else no mobility measurements are to be performed. In some examples, the indication is sent using more than one bit. The indication might be sent using broadcast signalling to all UEs 300*a* or using dedicated signalling to individual UEs 300*a*. In some examples, the indication is sent in any of: a reference signal, a system information block (SIB), a master information block (MIB), radio resource control (RRC) signalling, downlink control information (DCI), a medium access control (MAC) control element, a paging-message.

There could be further pieces of information that is sent with the indication in S108. In some embodiments, the indication is accompanied by any of: measurement configuration based on which the subset of UEs 300*a* are to perform mobility measurements, identification of the UEs 300*a* in the subset of UEs 300*a*, identification of cells and/or carriers/frequencies on which the subset of UEs 300*a* are to perform mobility measurements.

In some aspects, the network node 200*a* forwards information as obtained in S102 to its child network nodes. That is, in some embodiments, where the network node 200*a* is operatively connected to at least one child network node 200*c*, the network node 200*a* is configured to perform (optional) step S104:

S104: The network node 200*a* forwards the information (as obtained in S102) towards the at least one child network node 200*c*.

In some aspects, the network node 200 is made aware of the backhaul link qualities of neighbouring network nodes in the same cell 500*a* or in another cell 500*b*. This can be requested and received via the X2 interface or via a donor network node. That is, in some embodiments, the network node 200*a* is configured to perform (optional) step S106:

S106: The network node 200*a* obtains backhaul link quality information of another wireless backhaul link in another cell 500*b* than the cell 500*a* of the network node 200*a*.

The UEs 300*a* might then be instructed not to measure on neighbouring cell 500*b* with poor backhaul link quality. That is, in some embodiments, when the backhaul link quality information of this another wireless backhaul link indicates that this another wireless backhaul link suffers from deterioration, the indication sent to the subset of UEs 300*a* instructs the subset of UEs 300*a* to refrain from performing mobility measurements on the cell 500*b* of this another wireless backhaul link.

In some examples, the network node 200*a* could also obtain backhaul link quality information of another wireless backhaul link of another network node in the same cell 500*a* as the network node 200*a*. If the backhaul link quality of the network node 200*a* is worse than the backhaul link quality of this another network node, an indication might be sent by the network node 200*a* for triggering UEs to perform mobility measurements. That is, as a result of having obtained the information, the network node 200*a* might send to at least a subset of all UEs 300*a* served by the network node 200*a* in a cell 500*a*, an indication for the subset of UEs 300*a* to perform mobility measurements.

There could be different handover actions that are determined in S112. Different embodiments relating thereto will now be described in turn.

In some embodiments, the handover action involves the subset of UEs 300*a* to be handed over to any cell 500*b* as indicated in the mobility measurement reports providing higher access link quality than a threshold access link quality value. Further details thereof will be disclosed with reference to the flowchart of FIG. 6.

In some embodiments, the handover action involves the subset of UEs 300*a* to be handed over to any cell 500*b* as indicated in the mobility measurement reports providing combined higher access link quality and higher backhaul link quality than the cell 500*a* of the IAB node 200*a*. Further details thereof will be disclosed with reference to the flowchart of FIG. 7.

In some embodiments, the handover action involves the subset of UEs 300*a* to be handed over to any cell 500*b* as indicated in the mobility measurement reports where minimum of access link quality and backhaul link quality is higher than in the cell 500*a* of the IAB node 200*a*. Further details thereof will be disclosed with reference to the flowchart of FIG. 8.

In some embodiments, the handover action involves the subset of UEs 300*a* to be handed over to any cell 500*b* as indicated in the mobility measurement reports providing combined higher access link quality, higher backhaul link quality, higher bitrate than the cell 500*a* of the network node 200*a*. Further details thereof will be disclosed with reference to the flowchart of FIG. 9.

Once having determined the handover action, the handover action might be provided to at least some of the UEs 300*a* served by the network node 200*a*. That is, in some embodiments, the network node 200*a* is configured to perform (optional) step S114:

S114: The network node 200*a* sends a handover command in accordance with the handover action.

The handover command might be sent to all, or only some, UEs 300*a* served by the network node 200*a*. That is, in some embodiments, the handover command is sent only to a subset of the subset of UEs 300*a*.

The subset of the subset of UEs 300*a* might be those UEs 300*a* with the worst wireless access links, those UEs 300*a* with worst combined links, and/or those UEs 300*a* requiring, or using, the highest bitrates.

Figure 4:
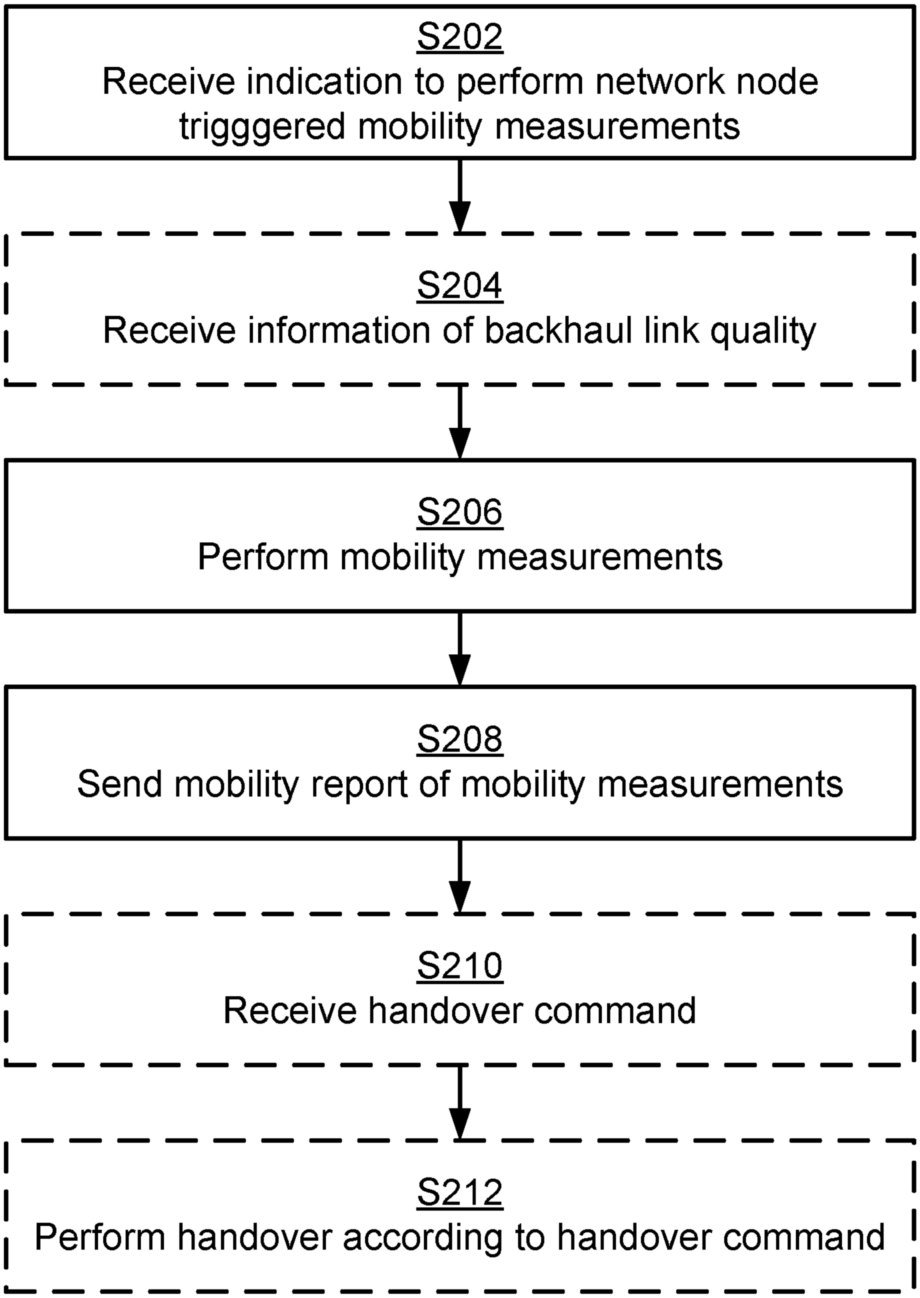

Reference is now made to FIG. 4 illustrating a method for network node triggered mobility measurement reporting as performed by the UE 300*a* according to an embodiment.

As disclosed below, the network node 200*a* in S108 sends an indication for the UE 300*a* to perform mobility measurements. It is assumed that the UE 300*a* receives the indication and thus is configured to perform step S202:

S202: The UE 300*a* receives, from a network node 200*a* serving the UE 300*a* in a cell 500*a*, an indication to perform network node triggered mobility measurements.

The UE 300*a* then performs mobility measurements accordingly and is thus configured to perform step S206:

S206: The UE 300*a*, in response to having received the indication in S202, performs mobility measurements on reference signals received from at least one other network node 200*b*, 200*c*.

In some examples, the mobility measurements could be performed on reference signals such as Synchronization Signal Block (SSB) or Channel State Information Reference signal (CSI-RS). The mobility measurement could relate to quality that pertains to at least one of: reference signal received power (RSRP), signal to interference plus noise ratio (SINR), reference signal received quality (RSRQ), received signal strength indicator (RSSI), etc. As an example, the obtained mobility measurement relates to quality of one or more wireless access links of the UE 300*a*, such as quality of the wireless access link 130*a* from the UE 300*a* to the serving network node 200*a*, quality of the wireless access link 130*b* from the UE 300*a* to the network node 200*b*, and/or quality of the wireless access link 130*e* from the UE 300*a* to the network node 200*c*.

Upon having performed the mobility measurements, the mobility measurements are reported to the network node 200*a*. That is, the UE 300*a* is configured to perform step S208:

S208: The UE 300*a* sends a mobility report of the mobility measurements to the network node 200*a* serving the UE 300*a*.

Embodiments relating to further details of network node triggered mobility measurement reporting as performed by the UE 300*a* will now be disclosed.

In some aspects, the UE 300*a* receives an indication from another cell 500*b* than the cell 500*a* served by the network node 200*a* of backhaul link quality in this other cell 500*b*. In particular, in some embodiments, the UE 300*a* is configured to perform (optional) step S204:

S204: The UE 300*a* receives, from a network node 200*d* of another cell 500*b*, information of deteriorating backhaul link quality of a wireless backhaul link in this another cell 500*b*.

The UE 300*a* then in S206 refrains from performing mobility measurements on reference signals (such as SSB or CSI-RS) received from any network nodes 200*d* of this another cell 500*b*.

As disclosed above, in some embodiments the network node 200*a* sends a handover command in accordance with a determined handover action. As further disclosed above, the handover command might be sent to all, or only some, UEs 300*a* served by the network node 200*a*. In some aspects, it is thus assumed that the UE 300*a* receives the handover command. That is, in some embodiments, the UE 300*a* is configured to perform (optional) step S210:

S210: The UE 300*a* receives a handover command from the network node 200*a* serving the UE. The handover command is dependent on backhaul link quality of a wireless backhaul link in the cell 500*a* and on the mobility measurement report.

The UE 300*a* might then act according to the received handover command. That is, in some embodiments, the UE 300*a* is configured to perform (optional) step S212:

S212: The UE 300*a* performs a handover according to the handover command.

Non-limiting examples of handover of the UE 300*a* will now be disclosed.

In one case, for a UE 300 in RRC IDLE mode or RRC INACTIVE mode, the cell selection, or cell reselection, procedure might be improved so that the UE 300*a* selects, or reselects, a cell with best wireless access link and best wireless backhaul links.

In another case, the UE might improve its RRC connection reestablishment procedure. During an RRC connection reestablishment procedure, the UE 300*a* might select a cell with best wireless access link and best wireless backhaul links to reestablish its RRC connection.

In yet another case, a condition handover (CHO) procedure is example. The serving network node 200*a* might configure the UE 300*a* with multiple CHO candidates.

Each such CHO candidate is then associated with certain trigger conditions. One or multiple trigger conditions related to wireless backhaul links could be configured for each CHO candidate.

In yet another case, for a UE 300*a* configured with multiple wireless access links, data split, or data flow mapping, might be performed based on the information as received in S202. The data or flows on the wireless access links with the indication could be remapped to other wireless access links without the indication.

For any above case, a joint consideration of both wireless backhaul links and wireless access link could be configured for the UE 300*a*.

Further examples of handover actions according to which the handover is to be performed have been disclosed below and apply equally here.

As disclosed above, there could be different ways for the network node 200*a* to send the indication in S108. The UE 300*a* might thus receive the indication in s102 in the corresponding ways. That is, in some examples, the indication is received in any of: a reference signal, a SIB, a MIB, RRC signalling, DCI, a MAC control element, a paging-message.

As disclosed above, there could be further pieces of information that is sent with the indication in S108. The UE 300*a* might thus receive the corresponding further pieces of information. That is, in some embodiments, the indication is accompanied by any of: measurement configuration based on which the UE 300_a_ is to perform mobility measurements, identification of the UE 300_a_, identification of cells and/or carriers/frequencies on which the UE 300_a_ is to perform mobility measurements.

As disclosed above, the UE 300_a_ might be instructed not to measure on neighbouring cell 500_b_ with poor backhaul link quality. That is, in some embodiments, the indication instructs the UE 300_a_ to refrain from performing mobility measurements on at least one other cell 500_b_ than the cell 500_a_ of the network node 200_a_.

Four particular embodiments for triggering mobility measurements based on at least some of the above disclosed embodiments will now be disclosed. In general terms, when the backhaul link quality of a wireless backhaul link drops below a threshold quality value, an indication is sent to all or a subset of UEs for which this wireless backhaul link is utilized. Upon reception of the reports of mobility measurements from the UEs, the network node 200_a_ checks if there are other network nodes with sufficient access link quality. The network node 200_a_ may then send handover commands to all or a subset of the UEs to a ensure optimal performance.

Figure 5:
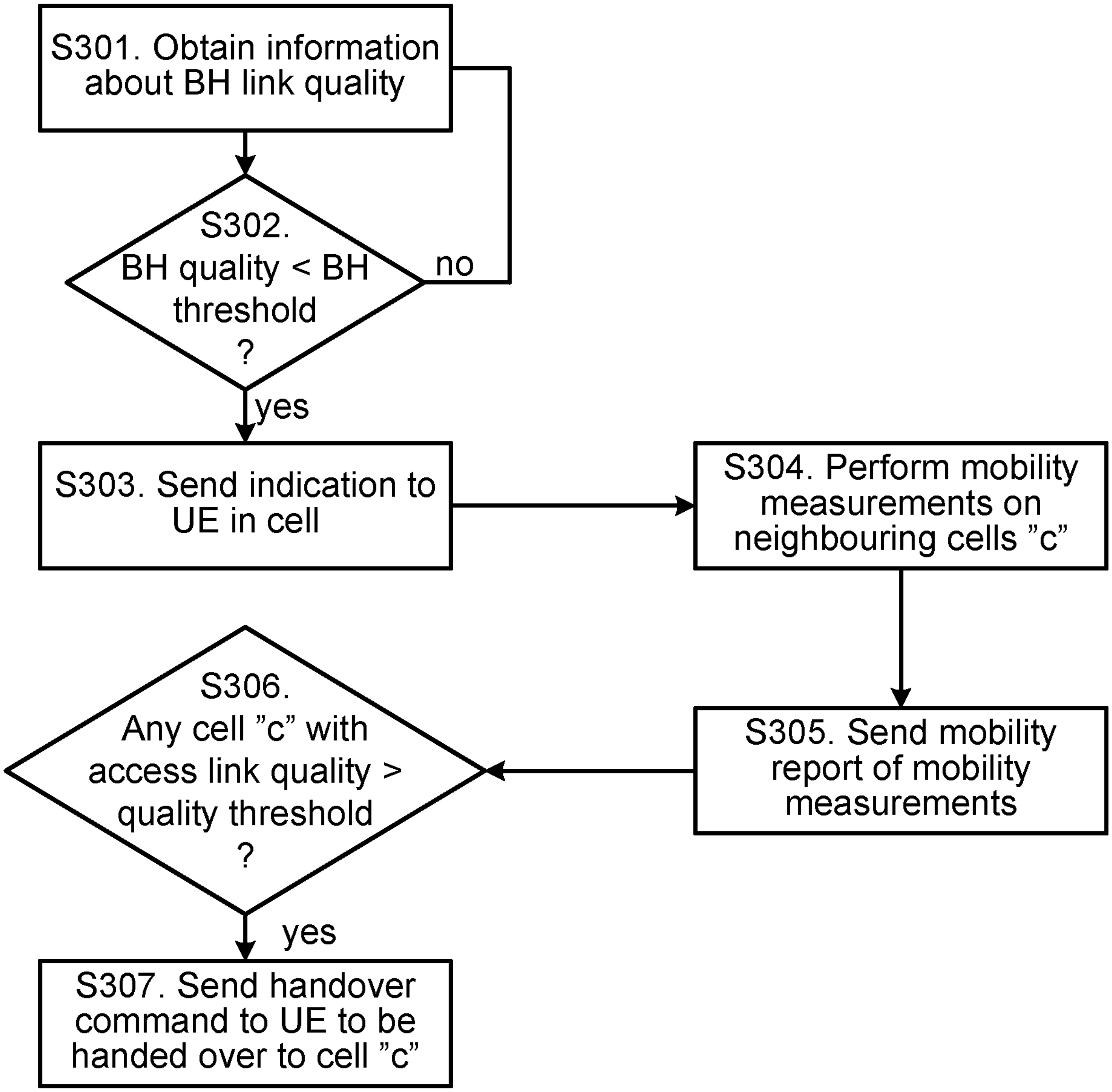

A first particular embodiment for triggering mobility measurements based on at least some of the above disclosed embodiments will now be disclosed in detail with reference to the flowchart of FIG. 5.

In this embodiment, whether to perform handover or not is based on fixed thresholds.

S301: The network node 200_a_ obtains information about backhaul (BH) link quality of a wireless backhaul link of the network node 200_a_.

S302: The network node 200_a_ checks if the backhaul link quality of the wireless backhaul link is below threshold link quality value. If yes, step S303 is entered, and else step S301 is entered again.

S303: The network node 200_a_ sends to at least a subset of all UEs 300_a_ served by the network node 200_a_, an indication for the subset of UEs 300_a_ to perform mobility measurements.

S304: The UEs 300_a_ having received the indication perform mobility measurements on reference signals received from at least one other network IAB node 200_c_ of a neighbouring cell "c" 500_b_.

S305: The UEs 300_a_ send a mobility report of the mobility measurements to the network node 200_a_ serving the UEs 300_a_.

S306: The network node 200_a_, for each received mobility report and for each UE 300_a_ having reported a mobility report, checks if the UE 300_a_ has reported any neighbouring cell "c" 500_b_ providing higher access link quality than a threshold access link quality value. If yes, step S307 is entered, and else no further action is taken.

S307: The network node 200_a_ determines to handover the UEs 300_a_ to a network node of the neighbouring cell "c" 500_b_ identified in S306 and sends a corresponding handover command to the UEs 300_a_.

Figure 6:
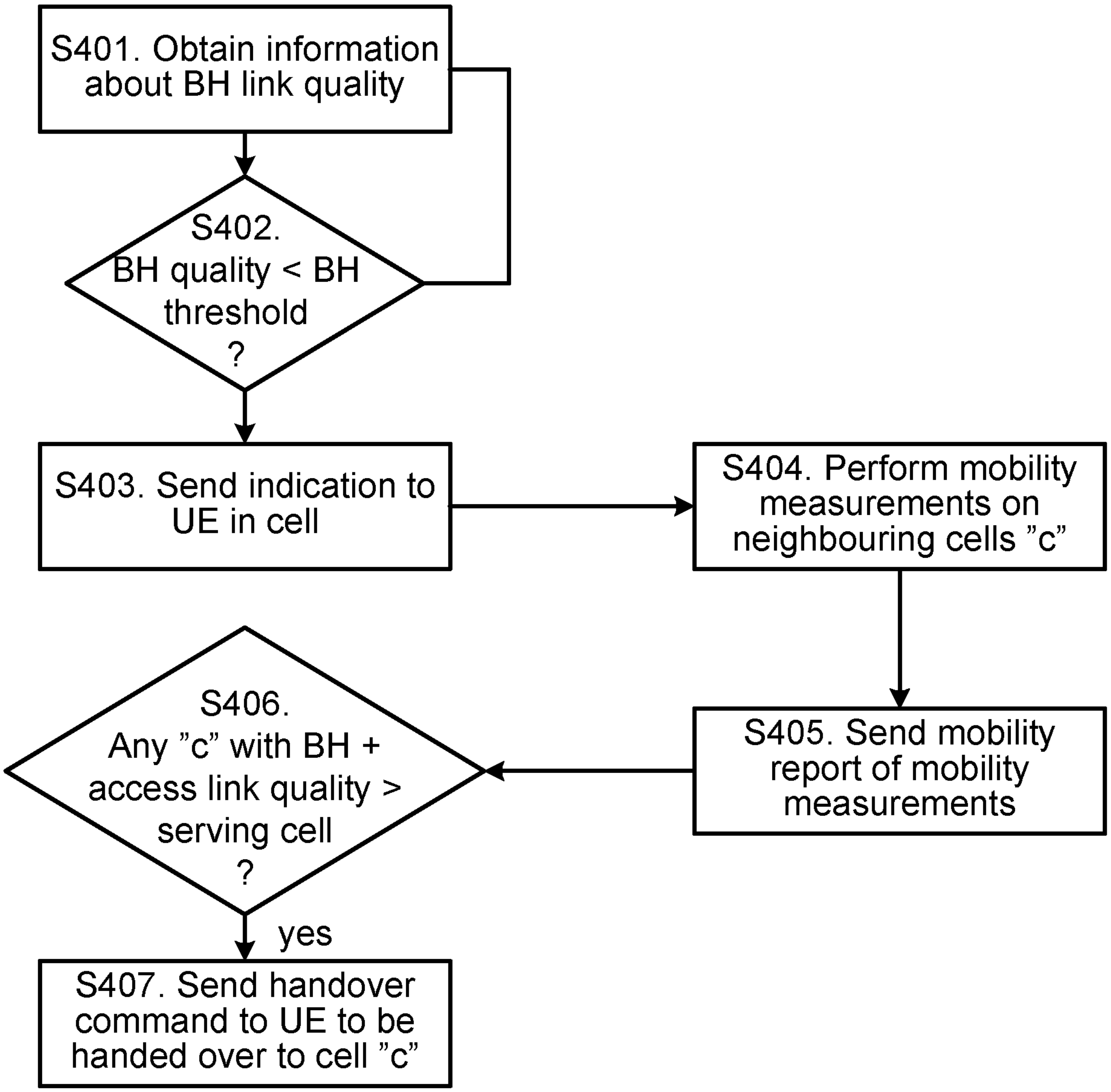

A second particular embodiment for triggering mobility measurements based on at least some of the above disclosed embodiments will now be disclosed in detail with reference to the flowchart of FIG. 6.

In this embodiment, whether to perform handover or not is based on a combination of measurements of the wireless access link and the wireless backhaul link of the serving network node and any network nodes in a neighbouring cell 500_b_.

S401: The network node 200_a_ obtains information about backhaul link quality of a wireless backhaul link of the network node 200_a_.

S402: The network node 200_a_ checks if the backhaul link quality of the wireless backhaul link is below threshold link quality value. If yes, step S303 is entered, and else step S401 is entered again.

S403: The network node 200_a_ sends to at least a subset of all UEs 300_a_ served by the network node 200_a_, an indication for the subset of UEs 300_a_ to perform mobility measurements.

S404: The UEs 300_a_ having received the indication perform mobility measurements on reference signals received from at least one other network IAB node 200_c_ of a neighbouring cell 500_b_.

S405: The UEs 300_a_ send a mobility report of the mobility measurements to the network node 200_a_ serving the UEs 300_a_.

S406: The network node 200_a_, for each received mobility report and for each UE 300_a_ having reported a mobility report, checks if the UE 300_a_ has reported any neighbouring cell 500_b_ providing combined higher access link quality and higher backhaul link quality than the cell serving cell 500_a_. If yes, step S407 is entered, and else no further action is taken.

S407: The network node 200_a_ determines to handover the UEs 300_a_ to a network node of the neighbouring cell identified in S406 and sends a corresponding handover command to the UEs 300_a_.

The access link quality and backhaul link quality might be considered with respect to either available bitrate or maximum bitrate.

Figure 7:
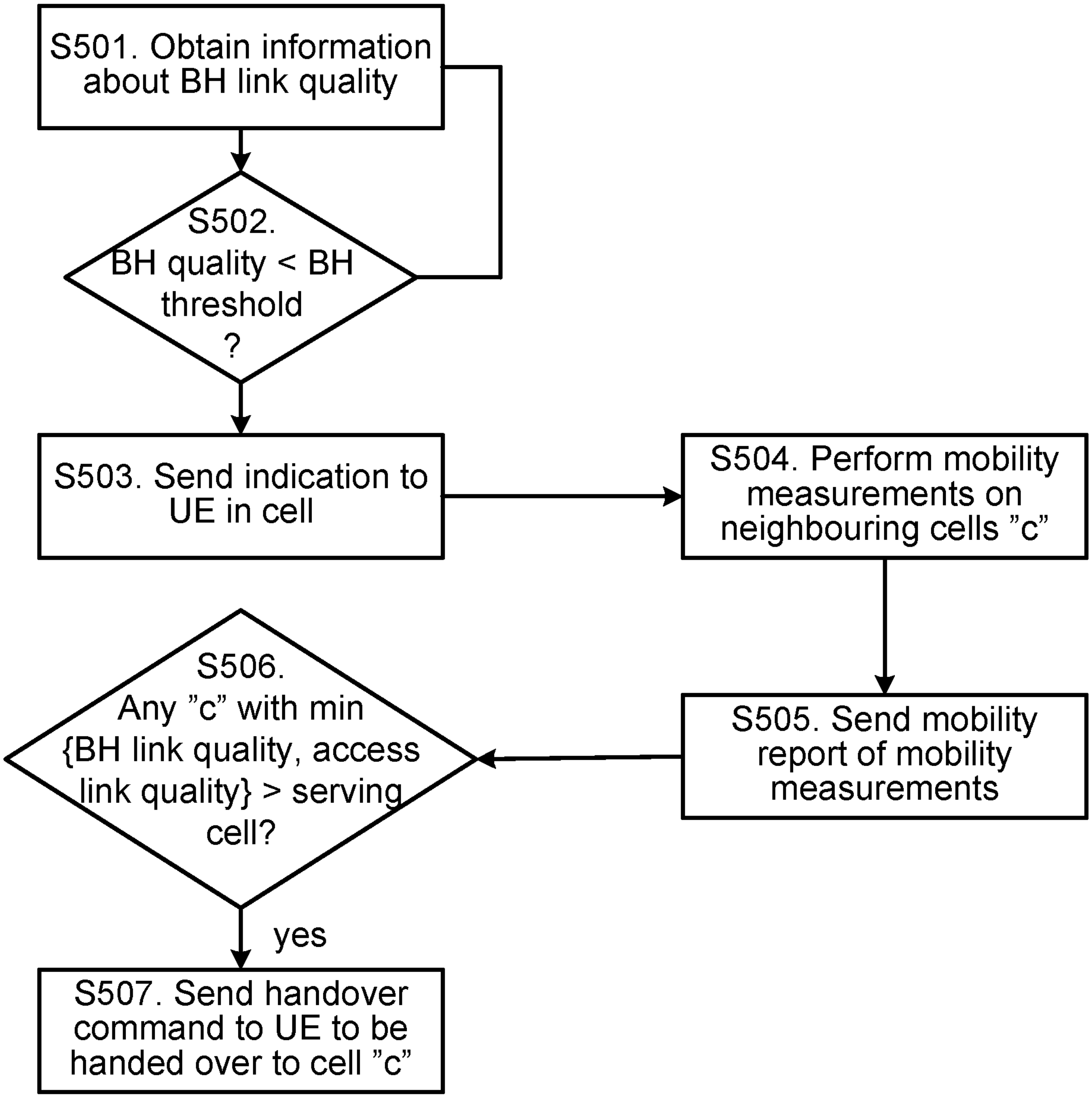

A third particular embodiment for triggering mobility measurements based on at least some of the above disclosed embodiments will now be disclosed in detail with reference to the flowchart of FIG. 7.

In this embodiment, whether to perform handover or not is based on checking if there are any neighbouring cell 500_b_ that has a minimum of the backhaul link quality and the access link quality that is higher than for the serving cell 500_a_.

S501: The network node 200_a_ obtains information about backhaul link quality of a wireless backhaul link of the network node 200_a_.

S502: The network node 200_a_ checks if the backhaul link quality of the wireless backhaul link is below threshold link quality value. If yes, step S303 is entered, and else step S501 is entered again.

S503: The network node 200_a_ sends to at least a subset of all UEs 300_a_ served by the network node 200_a_, an indication for the subset of UEs 300_a_ to perform mobility measurements.

S504: The UEs 300_a_ having received the indication perform mobility measurements on reference signals received from at least one other network IAB node 200_c_ of a neighbouring cell 500_b_.

S505: The UEs 300_a_ send a mobility report of the mobility measurements to the network node 200_a_ serving the UEs 300_a_.

S506: The network node 200_a_, for each received mobility report and for each UE 300_a_ having reported a mobility report, checks if the UE 300_a_ has reported any neighbouring cell 500_b_ where the minimum of access link quality and backhaul link quality is higher than in the serving cell 500_a_. If yes, step S507 is entered, and else no further action is taken.

S507: The network node 200*a* determines to handover the UEs 300*a* to a network node of the neighbouring cell identified in S506 and sends a corresponding handover command to the UEs 300*a*.

Figure 8:
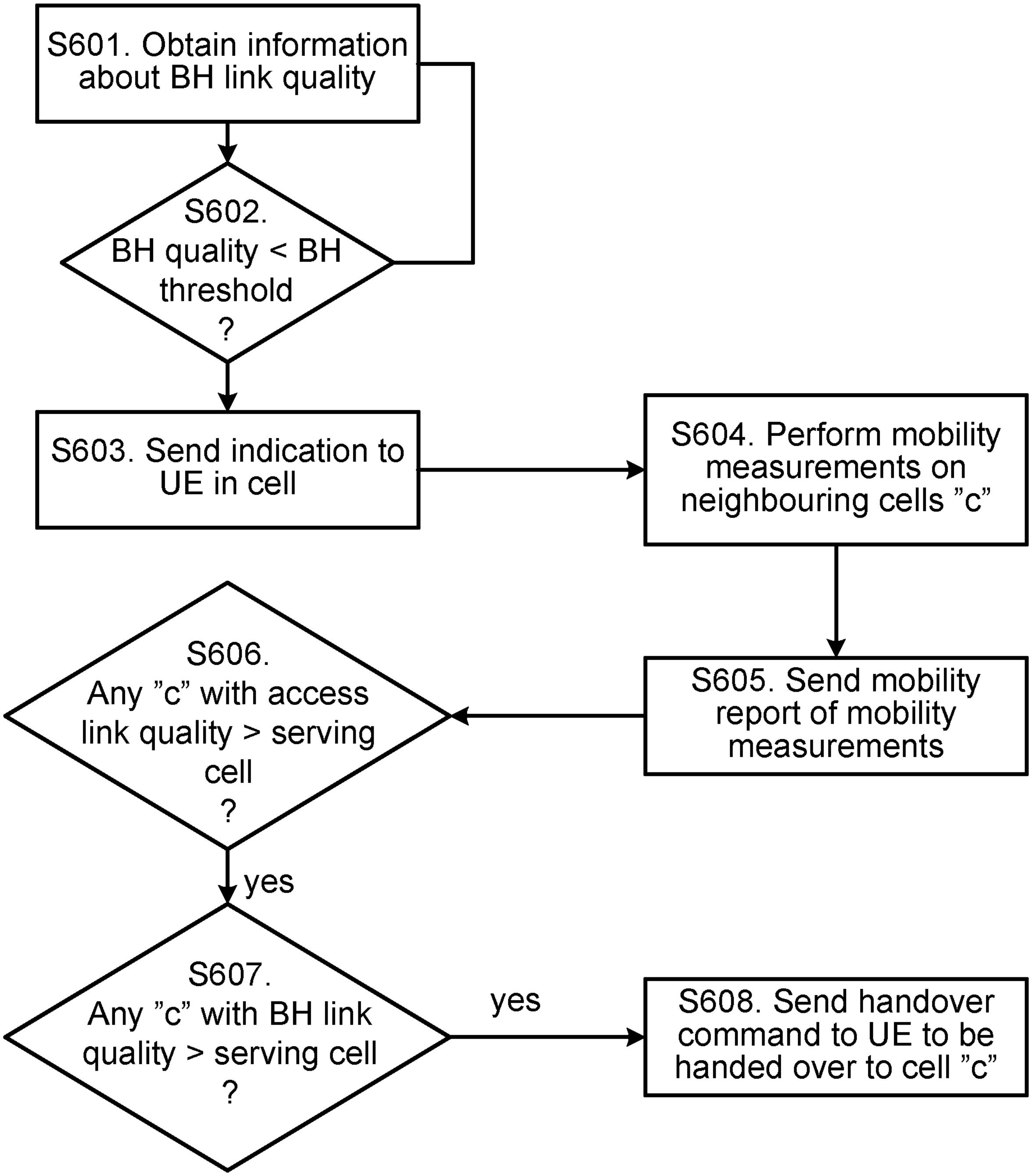

A fourth particular embodiment for triggering mobility measurements based on at least some of the above disclosed embodiments will now be disclosed in detail with reference to the flowchart of FIG. 8.

In this embodiment, whether to perform handover or not is based on maintaining a stable and efficient load on the different network nodes even when the backhaul link quality of one wireless backhaul link is deteriorating. Here, the network node 200*a* determine which network node each UE 300*a* should be connected to based on a comparison of backhaul link quality of network nodes in neighbouring cells 500*b*, combined with the access link quality, and additionally, combined with the UEs used bitrate. This enables the network node 200*a* to perform load balancing by handing over of some UEs 300*a* to network nodes of neighbouring cells 500*a* where the UE 300*a* has acceptable access link quality and where the backhaul link quality is better than that of the network node 200*a*.

S601: The network node 200*a* obtains information about backhaul link quality of a wireless backhaul link of the network node 200*a*.

S602: The network node 200*a* checks if the backhaul link quality of the wireless backhaul link is below threshold link quality value. If yes, step S303 is entered, and else step S601 is entered again.

S603: The network node 200*a* sends to at least a subset of all UEs 300*a* served by the network node 200*a*, an indication for the subset of UEs 300*a* to perform mobility measurements.

S604: The UEs 300*a* having received the indication perform mobility measurements on reference signals received from at least one other network IAB node 200*c* of a neighbouring cell 500*b*.

S605: The UEs 300*a* send a mobility report of the mobility measurements to the network node 200*a* serving the UEs 300*a*.

S606: The network node 200*a*, for each received mobility report and for each UE 300*a* having reported a mobility report, checks if the UE 300*a* has reported any neighbouring any cell 500*b* providing higher access link quality than the serving cell 500*a*. If yes, step S607 is entered, and else no further action is taken.

S607: The network node 200*a*, for each received mobility report and for each UE 300*a* having reported a mobility report, checks if the UE 300*a* has reported any neighbouring any cell 500*b* providing higher backhaul link quality than the serving cell 500*a*. If yes, step S608 is entered, and else no further action is taken.

S608: The network node 200*a* determines to handover the UEs 300*a* to a network node of the neighbouring cell identified in S607 and sends a corresponding handover command to the UEs 300*a*.

Figure 9:
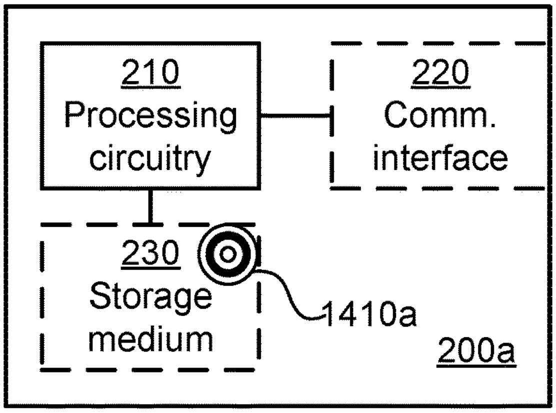
FIG. 9 is a schematic diagram showing functional units of a network node according to an embodiment.

FIG. 9 schematically illustrates, in terms of a number of functional units, the components of a network node 200*a* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410*a* (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200*a* to perform a set of operations, or steps, as disclosed above. For example, the storage medium 230 may store the set of operations, and the processing circuitry 210 may be configured to retrieve the set of operations from the storage medium 230 to cause the network node 200*a* to perform the set of operations. The set of operations may be provided as a set of executable instructions. Thus, the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200*a* may further comprise a communications interface 220 for communications with other entities, functions, nodes and devices, as in FIG. 1 and FIG. 2. As such the communications interface 220 may comprise one or more transmitters and receivers, comprising analogue and digital components.

The processing circuitry 210 controls the general operation of the network node 200*a* e.g. by sending data and control signals to the communications interface 220 and the storage medium 230, by receiving data and reports from the communications interface 220, and by retrieving data and instructions from the storage medium 230. Other components, as well as the related functionality, of the network node 200*a* are omitted in order not to obscure the concepts presented herein.

Figure 10:
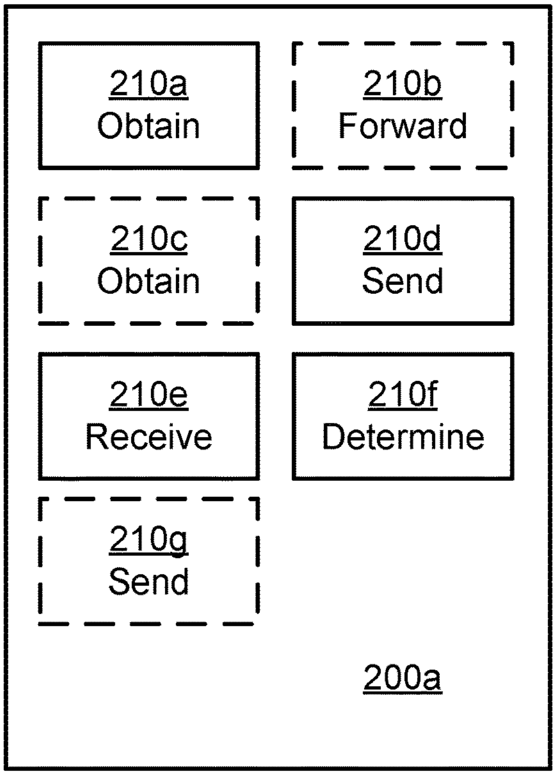
FIG. 10 is a schematic diagram showing functional modules of a network node according to an embodiment.

FIG. 10 schematically illustrates, in terms of a number of functional modules, the components of a network node 200*a* according to an embodiment. The network node 200*a* of FIG. 10 comprises a number of functional modules; an obtain module 210*a* configured to perform step S102, a send module 210*d* configured to perform step S108, a receive module 210*e* configured to perform step S110, and a determine module 210*f* configured to perform step S112. The network node 200*a* of FIG. 10 may further comprise a number of optional functional modules, such as any of a forward module 210*b* configured to perform step S104, an obtain module 210*c* configured to perform step S106, and a send module 210*g* configured to perform step S114.

In general terms, each functional module 210*a*-210*g* may be implemented in hardware or in software. Preferably, one or more or all functional modules 210*a*-210*g* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*g* and to execute these instructions, thereby performing any steps of the network node 200*a* as disclosed herein.

The network node 200*a* may be provided as a standalone device or as a part of at least one further device. For example, the network node 200*a* may be provided in a node of the radio access network or in a node of the core network. Alternatively, functionality of the network node 200*a* may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200*a* may be executed in a first device, and a second portion of the instructions performed by the network node 200*a* may be executed in a second device; the herein disclosed embodiments are not limited to any particular number of devices on which the instructions performed by the network node 200*a* may be executed. Hence, the methods according to the herein disclosed embodiments are suitable to be performed by a network node 200*a* residing in a cloud computational environment. Therefore, although a single processing circuitry 210 is illustrated in FIG. 9 the processing circuitry 210 may be distributed among a plurality of devices, or nodes. The same applies to the functional modules 210*a*-210*g* of FIG. 10 and the computer program 1420*a* of FIG. 13.

Figure 11:
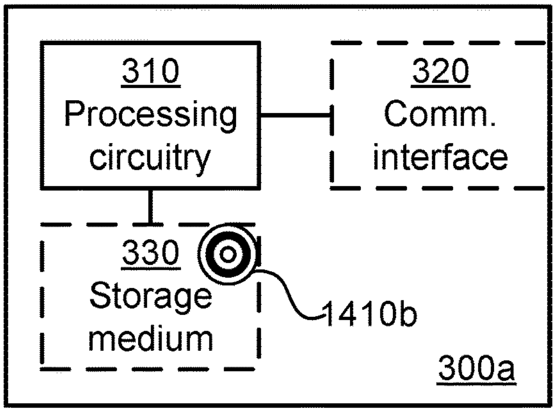
FIG. 11 is a schematic diagram showing functional units of a UE according to an embodiment.

FIG. 11 schematically illustrates, in terms of a number of functional units, the components of a UE 300*a* according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the UE 300*a* to perform a set of operations, or steps, as disclosed above. For example, the storage medium 330 may store the set of operations, and the processing circuitry 310 may be configured to retrieve the set of operations from the storage medium 330 to cause the UE 300*a* to perform the set of operations. The set of operations may be provided as a set of executable instructions. Thus, the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The UE 300*a* may further comprise a communications interface 320 for communications with other entities, functions, nodes and devices, as in FIG. 1 and FIG. 2. As such the communications interface 320 may comprise one or more transmitters and receivers, comprising analogue and digital components.

The processing circuitry 310 controls the general operation of the UE 300*a* e.g. by sending data and control signals to the communications interface 320 and the storage medium 330, by receiving data and reports from the communications interface 320, and by retrieving data and instructions from the storage medium 330. Other components, as well as the related functionality, of the UE 300*a* are omitted in order not to obscure the concepts presented herein.

Figure 12:
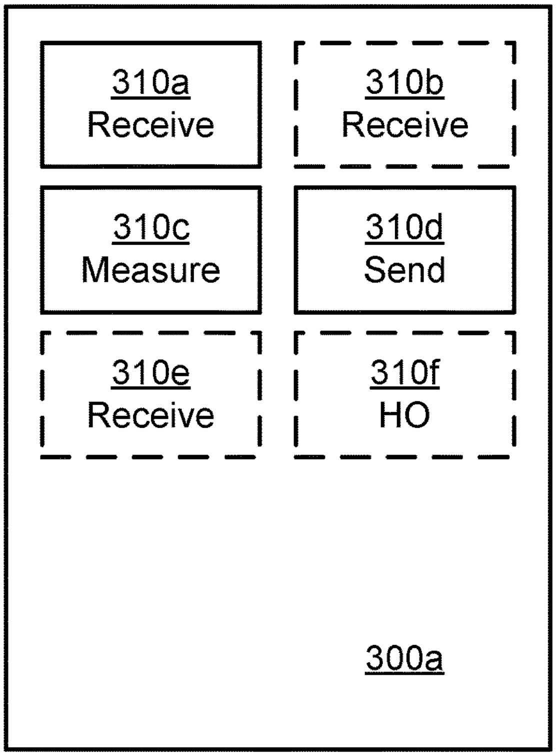
FIG. 12 is a schematic diagram showing functional modules of a UE according to an embodiment.

FIG. 12 schematically illustrates, in terms of a number of functional modules, the components of a UE 300*a* according to an embodiment. The UE 300*a* of FIG. 12 comprises a number of functional modules; a receive module 310*a* configured to perform step S202, a measure module 310*c* configured to perform step S206, and a send module 310*d* configured to perform step S208. The UE 300*a* of FIG. 12 may further comprise a number of optional functional modules, such as any of a receive module 310*b* configured to perform step S204, a receive module 310*e* configured to perform step S210, and a handover (HO) module 310*f* configured to perform step S112. In general terms, each functional module 310*a*-310*f* may be implemented in hardware or in software. Preferably, one or more or all functional modules 310*a*-310*f* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*f* and to execute these instructions, thereby performing any steps of the UE 300*a* as disclosed herein.

Figure 13:
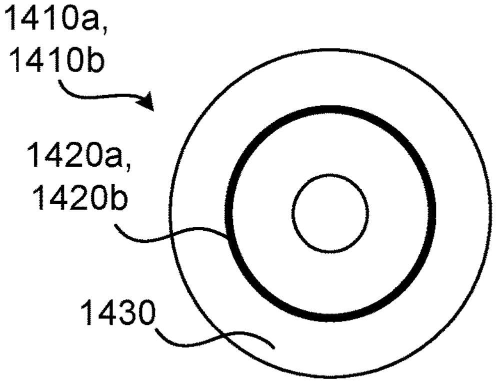
FIG. 13 shows one example of a computer program product comprising computer readable means according to an embodiment.

FIG. 13 shows one example of a computer program product 1410*a*, 1410*b* comprising computer readable means 1430. On this computer readable means 1430, a computer program 1420*a* can be stored, which computer program 1420*a* can cause the processing circuitry 210 and thereto operatively coupled entities and devices, such as the communications interface 220 and the storage medium 230, to execute methods according to embodiments described herein. The computer program 1420*a* and/or computer program product 1410*a* may thus provide means for performing any steps of the network node 200*a* as herein disclosed. On this computer readable means 1430, a computer program 1420*b* can be stored, which computer program 1420*b* can cause the processing circuitry 310 and thereto operatively coupled entities and devices, such as the communications interface 320 and the storage medium 330, to execute methods according to embodiments described herein. The computer program 1420*b* and/or computer program product 1410*b* may thus provide means for performing any steps of the UE 300*a* as herein disclosed.

In the example of FIG. 13, the computer program product 1410*a*, 1410*b* is illustrated as an optical disc, such as a CD (compact disc) or a DVD (digital versatile disc) or a Blu-Ray disc. The computer program product 1410*a*, 1410*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420*a*, 1420*b* is here schematically shown as a track on the depicted optical disk, the computer program 1420*a*, 1420*b* can be stored in any way which is suitable for the computer program product 1410*a*, 1410*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for triggering mobility measurements, the method being performed by a network node, the method comprising:

obtaining information about backhaul link quality of a wireless backhaul link of the network node; and as a result thereof:

sending, to at least a subset of all user equipment (UEs) served by the network node in a cell, an indication for the subset of UEs to perform mobility measurements;

receiving mobility measurement reports from the subset of UEs;

determining a handover action for the subset of UEs based at least on the backhaul link quality and on the mobility measurement reports, wherein the network node is an integrated access and backhaul (IAB) node; and obtaining backhaul link quality information of another wireless backhaul link of another network node in the cell or in another cell than the cell of the network node, wherein when the backhaul link quality information of said another wireless backhaul link indicates that said another wireless backhaul link suffers from deterioration, the indication sent to the subset of UEs instructs the subset of UEs to refrain from performing mobility measurements on the cell of said another wireless backhaul link.

2. The method according to claim 1, wherein the wireless backhaul link is towards a donor node of the network node or a parent network node of the network node, and wherein the information about the backhaul link quality pertains to that backhaul link quality of the wireless backhaul link towards the donor node is deteriorating.

3. The method according to claim 2, wherein the information that the backhaul link quality is deteriorating pertains to at least one of: the backhaul link quality of the wireless backhaul link is below threshold link quality value, bitrate of the wireless backhaul link is below a threshold bitrate value, transmission delay of the wireless backhaul link is above a threshold transmission delay value.

4. The method according to claim 2, wherein the backhaul link quality is determined to be deteriorating by being worse than a threshold value, by being worse than the backhaul link quality of another wireless backhaul link towards the donor node, or by being worse than the backhaul link quality of another wireless backhaul link towards another donor node.

5. The method according to claim 1, wherein the indication is sent in any of: a reference signal, a system information block (SIB), a master information block (MIB), radio resource control (RRC) signalling, downlink control information (DCI), a medium access control (MAC) control element, a paging-message.

6. The method according to claim 1, wherein the handover action involves the subset of UEs to be handed over to any cell as indicated in the mobility measurement reports providing higher access link quality than a threshold access link quality value.

7. The method according to claim 1, wherein the handover action involves the subset of UEs to be handed over to any cell as indicated in the mobility measurement reports providing combined higher access link quality and higher backhaul link quality than the cell of the IAB node.

8. The method according to claim 1, wherein the handover action involves the subset of UEs to be handed over to any cell as indicated in the mobility measurement reports where minimum of access link quality and backhaul link quality is higher than in the cell of the IAB node.

9. The method according to claim 1, wherein the handover action involves the subset of UEs to be handed over to any cell as indicated in the mobility measurement reports providing combined higher access link quality, higher backhaul link quality, higher bitrate than the cell of the network node.

10. A method for performing network node triggered mobility measurement reporting, the method being performed by a User Equipment (UE), the method comprising:

receiving, from a network node serving the UE in a cell, an indication to perform network node triggered mobility measurements; and in response thereto:

performing mobility measurements on reference signals received from at least one other network node; and sending a mobility report of the mobility measurements to the network node serving the UE; and receiving, from a network node of another cell, information of deteriorating backhaul link quality of a wireless backhaul link in said another cell, wherein the UE refrains from performing mobility measurements on reference signals received from any network nodes of the another cell.

11. The method according to claim 10, further comprising:

receiving a handover command from the network node serving the UE, wherein the handover command is dependent on backhaul link quality of a wireless backhaul link in the cell and on the mobility measurement report.

12. The method according to claim 10, wherein the indication is received in any of: a reference signal, a system information block (SIB), a master information block (MIB), radio resource control (RRC) signalling, downlink control information (DCI), a medium access control (MAC) control element, a paging-message.

13. The method according to claim 10, wherein the indication is accompanied by any of: measurement configuration based on which the UE is to perform mobility measurements, identification of the UE, identification of cells and/or carriers on which the UE is to perform mobility measurements.

14. A network node for triggering mobility measurements, the network node comprising processing circuitry, the processing circuitry being configured to cause the network node to:

obtain information about backhaul link quality of a wireless backhaul link of the network node; and as a result thereof:

send, to at least a subset of all user equipment (UEs) served by the network node in a cell, an indication for the subset of UEs to perform mobility measurements;

receive mobility measurement reports from the subset of UEs;

determine a handover action for the subset of UEs based at least on the backhaul link quality and on the mobility measurement reports; and obtain backhaul link quality information of another wireless backhaul link of another network node in the cell or in another cell than the cell of the network node, wherein when the backhaul link quality information of said another wireless backhaul link indicates that said another wireless backhaul link suffers from deterioration, the indication sent to the subset of UEs instructs the subset of UEs to refrain from performing mobility measurements on the cell of said another wireless backhaul link.

15. A User Equipment (UE) for performing network node triggered mobility measurement reporting, the UE comprising processing circuitry, the processing circuitry being configured to cause the UE to:

receive, from a network node serving the UE in a cell, an indication to perform network node triggered mobility measurements; and in response thereto:

perform mobility measurements on reference signals received from at least one other network node; and send a mobility report of the mobility measurements to the network node serving the UE; and receive, from a network node of another cell, information of deteriorating backhaul link quality of a wireless backhaul link in said another cell, wherein the UE refrains from performing mobility measurements on reference signals received from any network nodes of the another cell.

* * * * *